United States Patent [19]
Childers et al.

[11] Patent Number: 6,134,370
[45] Date of Patent: Oct. 17, 2000

[54] FIBER OPTIC CABLE GUIDE

[75] Inventors: Darrell R. Childers; Timothy S. Laws; Stuart R. Melton, all of Hickory, N.C.

[73] Assignee: Siecor Operations, LLC, Hickory, N.C.

[21] Appl. No.: 09/183,808

[22] Filed: Oct. 30, 1998

[51] Int. Cl.[7] .................................................. G02B 6/02
[52] U.S. Cl. .......................... 385/135; 385/86; 385/87; 174/74 R
[58] Field of Search ..................... 385/134, 135, 385/86, 87; 174/74 R, 84 R, 86, 135; 248/49, 51, 53

[56] References Cited

U.S. PATENT DOCUMENTS

| | | |
|---|---|---|
| 4,319,802 | 3/1982 | Bowes ........................................ 385/86 |
| 5,037,175 | 8/1991 | Weber ........................................ 385/76 |
| 5,073,044 | 12/1991 | Egner et al. ............................... 385/86 |
| 5,329,603 | 7/1994 | Watanabe et al. ........................ 385/86 |
| 5,347,603 | 9/1994 | Belenkiy et al. ......................... 385/86 |
| 5,530,787 | 6/1996 | Arnett ....................................... 385/137 |
| 5,640,476 | 6/1997 | Womack et al. .......................... 385/86 |
| 5,710,851 | 1/1998 | Walter et al. ............................. 385/85 |
| 5,781,681 | 7/1998 | Manning ................................... 385/86 |

*Primary Examiner*—Hemang Sanghavi
*Assistant Examiner*—Sung H. Pak
*Attorney, Agent, or Firm*—Michael L. Leetzow

[57] ABSTRACT

A fiber optic cable guide has a curved elongated member that fits between the strain relief boot and optical fiber to allow the fiber optical cable to bend without violating the minimum bend radius of the optical fibers. The fiber optic cable guide also retains at least a portion of the fiber optic cable.

25 Claims, 3 Drawing Sheets

FIBER OPTIC CABLE GUIDE

BACKGROUND

The present invention is directed to a fiber optic cable guide that allows a fiber optic cable to be bent up to ninety degrees or more without violating the minimum bend radius of the fiber optic cable. Typically, a fiber optic cable that is terminated in a cabinet or other enclosure, especially when space is limited, is required to bend through about ninety degrees shortly after the termination point However, if appropriate care is not given the cable, the bending of the cable may violate the minimum bend radius of the optical fiber, causing attenuation and even breaking of the optical fiber in the cable. Prior guides are available to prevent such bending and breakage, such as U.S. Pat. No. 5,640,476, directed to a guide sleeve, U.S. Pat. No. 5,347,603, directed to a right angle cable strain relief, and U.S. Pat. No. 5,037,175, directed to a clip for dressing of fiber optic cables. However, these devices have disadvantages including unsightliness, bulkiness that prevents their use in higher density applications, and a requirement for some that they be installed prior to the connectors being installed on the optical fiber. Thus, there is a need for a smaller guide that can be easily installed on the fiber optic cable as or after it is installed in the enclosure. Such features would allow the guide to be used when needed, are independent of the boot and connector combination, and also allow for use in higher density applications. Thus, there is a need for a fiber optic cable guide that achieves these benefits.

SUMMARY OF THE INVENTION

Among the objects of the present invention is a fiber optic cable guide that allows the fibers to bend without violating their minimum bend radius and that can be installed in the field, but also is not unsightly and does not interfere with the use of the fiber optic cables or adjacent cables in the enclosure.

Other objects and advantages of the present invention will become apparent from the following detailed description when viewed in conjunction with the accompanying drawings, which set forth certain embodiments of the invention. The objects and advantages of the invention will be realized and attained by means of the elements and combinations particularly pointed out in the appended claims.

To achieve the objects and in accordance with the purposes of the invention as embodied and broadly described herein, the invention comprises a fiber optic cable guide for removable placement on a fiber optic cable, the fiber optic cable having a minimum bend radius, a connector at at least one end, and a strain relief boot adjacent the connector, the fiber optic cable guide comprising an elongated member partially curved along its length with a radius of curvature not less than the minimum bend radius of the fiber optic cable, the elongated member having a first end and a second end, the first end dimensioned to fit between the fiber optic cable and strain relief boot and the second end configured to retain at least a portion of the fiber optic cable.

To achieve the objects and in accordance with the purposes of the invention as embodied and broadly described herein, the invention also comprises a fiber optic cable, the fiber optic cable having a minimum bend radius, a connector at at least one end, and a strain relief boot adjacent the connector, the fiber optic cable guide comprising an elongated member partially curved along its length with a radius of curvature not less than the minimum bend radius of the fiber optic cable, the elongated member configured to pass between the strain relief boot and the cable.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and, together with the description, serve to explain the principles of the invention.

DETAILED DESCRIPTION OF THE INVENTION

Figure 1:
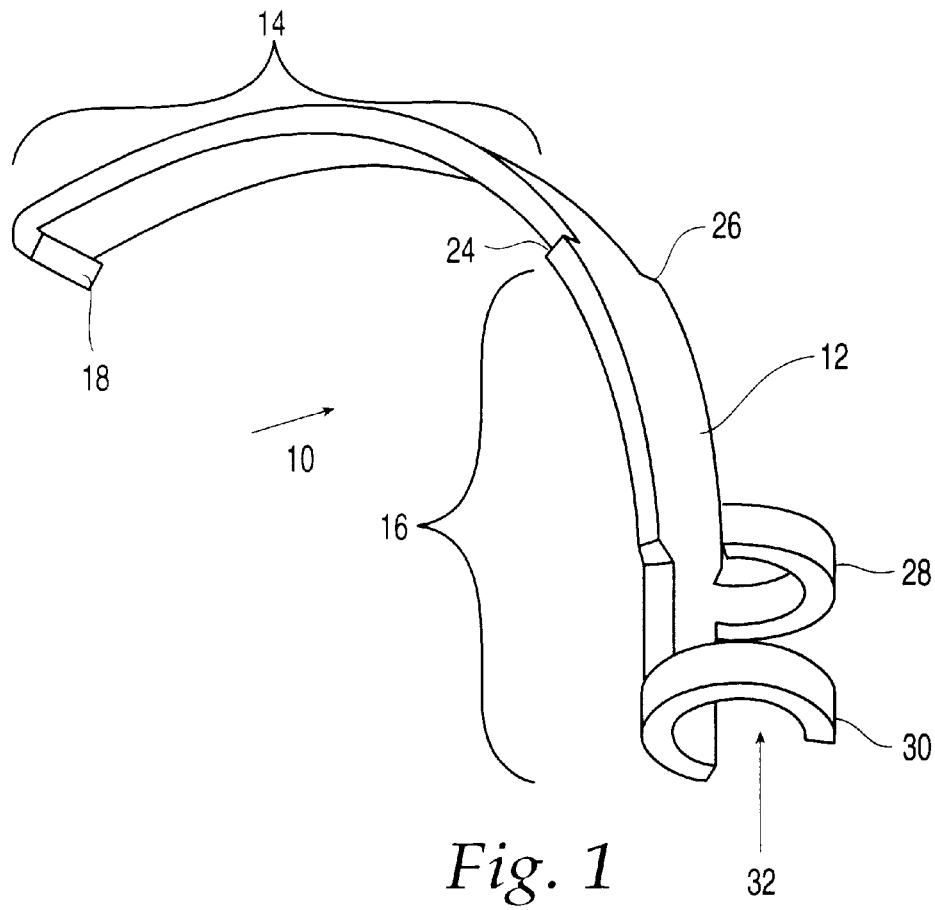
FIG. 1 is a front perspective view of a fiber optic cable guide according to the present invention.
Figure 3:
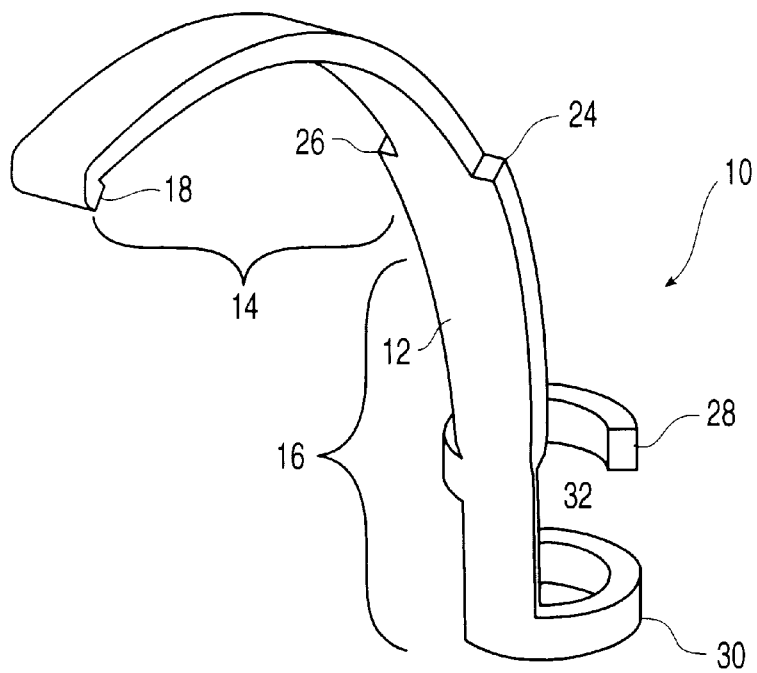
FIG. 3 is a rear perspective view thereof.
Figure 4:
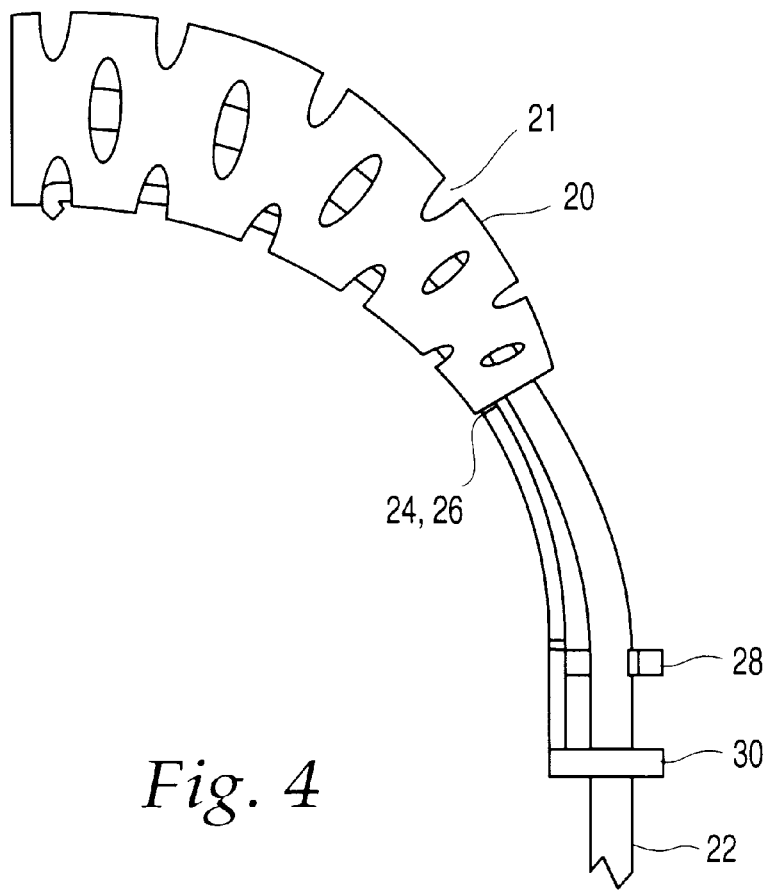
FIG. 4 is side elevational view of the cable guide attached to a fiber optic cable and strain relief boot.
Figure 5:
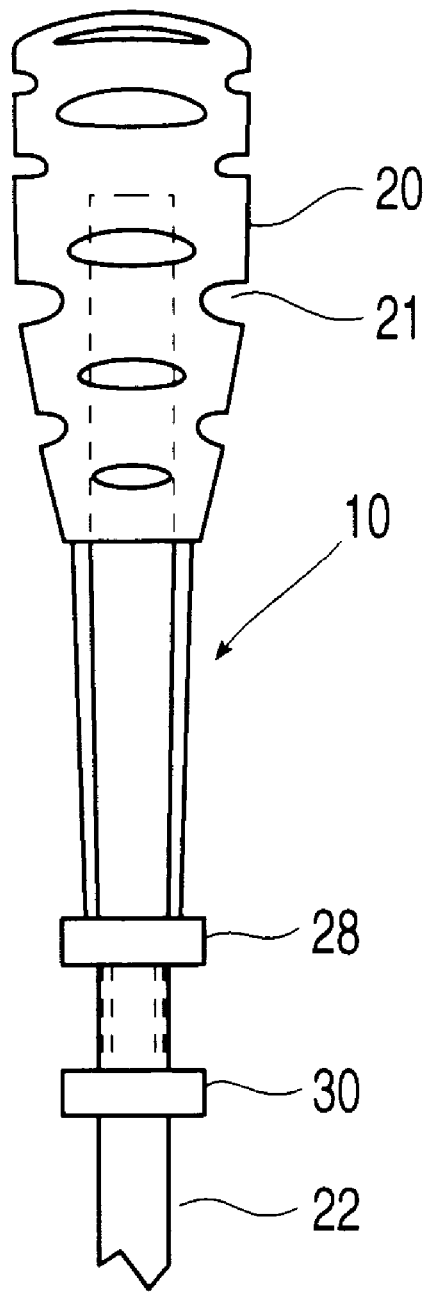
FIG. 5 is a front elevational view thereof.

Fiber optic cable guide 10, shown best in FIGS. 1 and 4, has a singular, elongated member 12 that is, for the purposes of description only, divided into two ends, first end 14 and second end 16. Preferably, first end 14 has a hook portion 18 to engage holes 21 in the strain relief boot 20 attached to a fiber optic cable 22 (See FIG. 4). The hook 18 prevents the guide 10 from slipping out of the boot 20 unintentionally, but does not prevent the guide 10 from being removed by an operator if the guide 10 is no longer needed or desired. The first end 14 could also be made without the hook 18 since the close relationship of the fiber optic cable 22 and strain relief boot 20 will hold the guide 10 in place by friction.

The guide 10 has two shoulders 24,26 to help the operator avoid inserting the guide 10 too far into the boot 20. The shoulders 24,26 contact the end of the boot 20, making it more difficult to insert the guide 10 any farther. While two shoulders are shown, only one or some other method to indicate that the hook is inserted a sufficient distance could be used, including a tab, post, etc. Additionally, the guide 10 has a wider section beginning at the shoulders 24,26 that tapers back to the same width as the first end 12 to assist in keeping the fiber optic cable on the guide 10 as it exits from the boot 20.

The second end 16 of the guide 10 preferably has two extensions 28,30 that extend from opposite sides of the guide 10 to form a channel 32 into which the fiber optic cable 22 is threaded. The two extensions or yokes 28,30 are curved around to the front of the guide 10 in two different directions and are axially displaced relative to one another to prevent the fiber optic cable 22 from being pulled out when the fiber optic cable 22 is pulled in a single direction. With the preferred configuration, the cable 22 must be moved in two opposite directions in order to free it from the second end 16 of the guide 10. The extensions 28,30 provide sufficient space in the channel 32 to allow the cable 22 to move axially relative to the guide 10 during insertion. The extensions 28,30 could be pressed inward toward the cable 22 to further limit the movement of the cable 22, but compressing the extensions into the cable 22 or the cable jacket can cause damage to or breakage of the optical fiber in the cable 22 if not done carefully.

Figure 2:
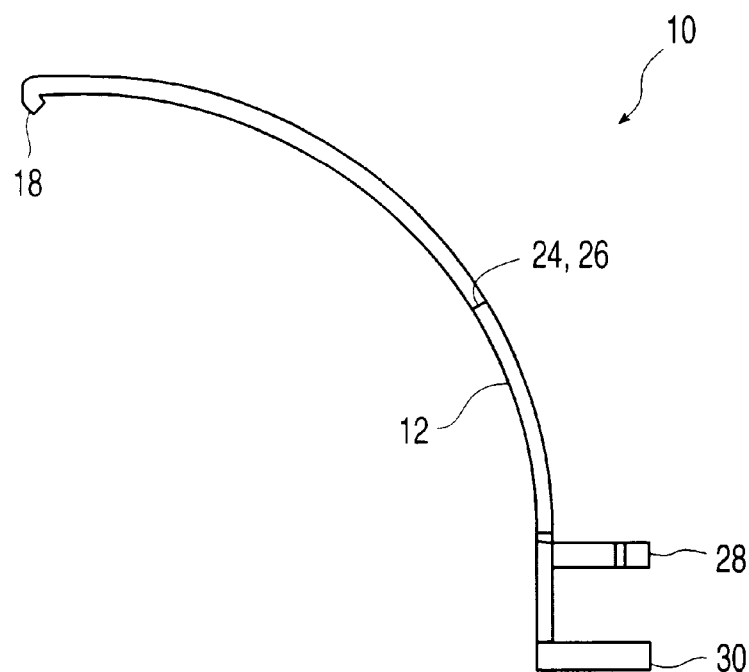
FIG. 2 is a side elevational view thereof.

First end 16 slides between the fiber optic cable 22 and strain relief boot 20 as shown in FIG. 4. Fiber optic cable guide 10 is preferably curved through 90° as can be seen in FIG. 2. However, the guide 10 can be used to curve the fiber optic cable 22 through any angle, as long as the minimum bend radius of the fiber optic cable is not violated. When first end 14 is inserted between the cable 22 and boot 20, the guide 10 causes the boot 20 and the cable 22 to bend in the same direction and generally the same angle as guide 10. Preferably, the guide 10 is made of steel, but any material could be used that has sufficient strength and would similarly cause the cable 22 and boot 20 to curve with the guide 10. Such materials include stainless steel, Beryllium Copper, spring steel, or any other metal with a high yield strength. Plastic could also be used if there were sufficient clearance between the boot and the cable to allow for a sufficient thickness, which depends on the prior construction of the boot 20 and fiber optic cable 22.

As an alternative embodiment, the extensions 28,30 could be shorter than those depicted in the preferred embodiment and not be axially displaced from one another. Thus, the extensions could come close to one another in the front of the guide 10, but allow sufficient spacing to allow the cable 22 to be pressed through them and into channel 32. While the fiber optic cable 22 could be removed from the guide 10 in this alternative embodiment by pulling in a single direction, there may be instances where such a configuration is desired, for example, in an enclosure that is not accessed with great frequency. It is also possible to have a portion of each side of the second end 16 wrap around with a slit providing an opening on the front or even the side of the guide to allow the cable to pass into the channel. Moreover, it is also possible to eliminate the extensions and shoulders on the guide 10 all together. For example, if the boot 20 were longer or the required bend was less than 90° (30° for example), the guide 10 (with or without hook portion 16) could be only the curved elongated member 12 that was inserted between the boot 20 and the fiber optic cable 22. The elongated boot would then function in a manner similar to the extension members toward the bottom of the guide 10 to ensure the bend through the full range. If the fiber optic cable only needed to be routed through about 30°, then a shorter boot 20 would achieve the 30° bend in the cable 22 without the need for the extension members.

The guide 10 is shown in FIG. 4 on a round fiber optic cable and corresponding strain relief boot. However, the guide 10 could also be used with a fiber optic ribbon and associated strain relief boot. Additionally, while the guide 10 is shown to be flat across its width, it could also be curved to more closely correspond to the curvature of the cable 22. Such a configuration would also provide more strength to resist bending, and also allow for a small and thinner guide to be used.

The preferred method of use is with the guide 10 inserted on the underside of the fiber optic cable 20. However, the guide could also be inserted on the top side of the cable (not shown) with the requisite changes to the placement of the extensions 28,30, the hook 18 and the curvature. Additionally, the guide 10 could also be mounted on either side of the cable with the guide curved in the plane of the width (rather than in the plane of the thickness as shown in the figures). That is, a plane is drawn across and parallel to the width of the guide 10, and the curvature of the guide 10 is in that plane. Thus, for the guide 10 shown in FIGS. 1–5, the curvature is in the plane that is through and parallel to the thickness of guide 10.

It will be apparent to those skilled in the art that various modifications and variations can be made in the connector sleeve assemblies and trays of the present invention and in construction of the assemblies and trays without departing from the scope or spirit of the invention.

We claim:

1. A fiber optic cable guide for removable placement on a fiber optic cable, the fiber optic cable having a minimum bend radius, a connector at at least one end, and a strain relief boot having a first end adjacent the connector, the fiber optic cable guide comprising:

an elongated member partially curved along its length with a radius of curvature not less than the minimum bend radius of the fiber optic cable, the elongated member having a first end and a second end, the first end of the elongated member dimensioned to fit between the fiber optic cable and strain relief boot at an end opposite the first end of the strain relief boot and the second end of the elongated member configured to retain at least a portion of the fiber optic cable.

2. The fiber optic cable guide of claim 1, wherein the second end includes at least one extension configured to wrap around at least a portion of the fiber optic cable.

3. The fiber optic cable guide of claim 1, wherein the first end has a hook portion to engage a portion of the strain relief boot.

4. The fiber optic cable guide of claim 1, wherein the guide is curved through about 90 degrees.

5. The fiber optic cable guide of claim 2, wherein the second end has at least two extensions configured to wrap around at least a portion of the fiber optic cable.

6. The fiber optic cable guide of claim 5, wherein the two extensions extend from opposite sides of the elongated member and are wrapped in opposite directions to generally conform to and loosely hold the optical fiber cable.

7. The fiber optic cable guide of claim 2, wherein the at least one extension allows axial movement of the fiber optic cable within the extension.

8. The fiber optic cable guide of claim 2, wherein the at least one extension can be crimped around the fiber optic cable to securely hold the cable.

9. The fiber optic cable guide of claim 4, wherein the at least two extensions are disposed at two different axial positions along the second end of the fiber optic cable guide.

10. The fiber optic cable guide of claim 1, the elongated member has a shoulder on each side between the first and second ends, the shoulder limiting insertion of the first end between the boot and fiber optic cable.

11. The fiber optic cable guide of claim 1, wherein the fiber optic cable is a fiber optic ribbon cable.

12. The fiber optic cable guide of claim 1, wherein the fiber optic cable is a round fiber optic cable.

13. The fiber optic cable guide of claim 1, wherein the guide is configured to be disposed on an underside of the fiber optic cable.

14. The fiber optic cable guide of claim 1, wherein the guide has a thickness, the thickness defining a plane, and the curvature of the guide being in the thickness plane.

15. The fiber optic cable guide of claim 1, wherein the guide has a width, the width defining a plane and the curvature of the guide being in the width plane.

16. The fiber optic cable guide of claim 1, wherein the guide has a width and a thickness, the width and thickness each defining a plane, the guide being curved in the planes of both the width and the thickness.

17. A method of removably routing a fiber optic cable through a curve, the fiber optic cable having a minimum bend radius, a connector at at least one end, and a strain relief boot adjacent the connector, the method comprising the steps of:

inserting a first end of an elongated optical cable guide member between the fiber optic cable and strain relief boot, the cable guide being partially curved along its length with a radius of curvature not less than the minimum bend radius of the fiber optic cable;

sliding the optical cable guide toward the connector; and positioning the fiber optic cable into at least one extension configured to hold at least a portion of the fiber optic cable at a second end of the cable guide.

18. The method of claim 17, wherein the fiber optic cable has a connector at both each end, the method allows the removable placement of the cable guide on the fiber without disturbing the connectors.

19. The method of claim 17, further comprising the step of wrapping the at least one extension to hold the fiber optic cable against the elongated member.

20. A fiber optic cable guide for removable placement on a fiber optic cable, the fiber optic cable having a minimum bend radius, a connector at least one end, and a strain relief boot having a first end adjacent the connector, the fiber optic cable guide comprising:

an elongated member partially curved along its length with a radius of curvature not less than the minimum bend radius of the fiber optic cable, at least a portion of the elongated member configured to pass between the strain relief boot and the cable at an end opposite the first end of the strain relief boot.

21. The fiber optic cable guide of claim 20, wherein the elongated member is further configured to retain at least a portion of the fiber optic cable extending beyond the strain relief boot.

22. The fiber optic cable guide of claim 20, wherein the guide is configured to be disposed on an underside of the fiber optic cable.

23. The fiber optic cable guide of claim 20, wherein the guide has a thickness, the thickness defining a plane, and the curvature of the guide being in the thickness plane.

24. The fiber optic cable guide of claim 20, wherein the guide has a width, the width defining a plane and the curvature of the guide being in the width plane.

25. The fiber optic cable guide of claim 20, wherein the guide has a width and a thickness, the width and thickness each defining a plane, the guide being curved in the planes of both the width and the thickness.

* * * * *